Jan. 26, 1971 L. A. BEECHAM 3,559,206
VEHICLE SAFETY CONTROL SYSTEM
Filed March 29, 1968
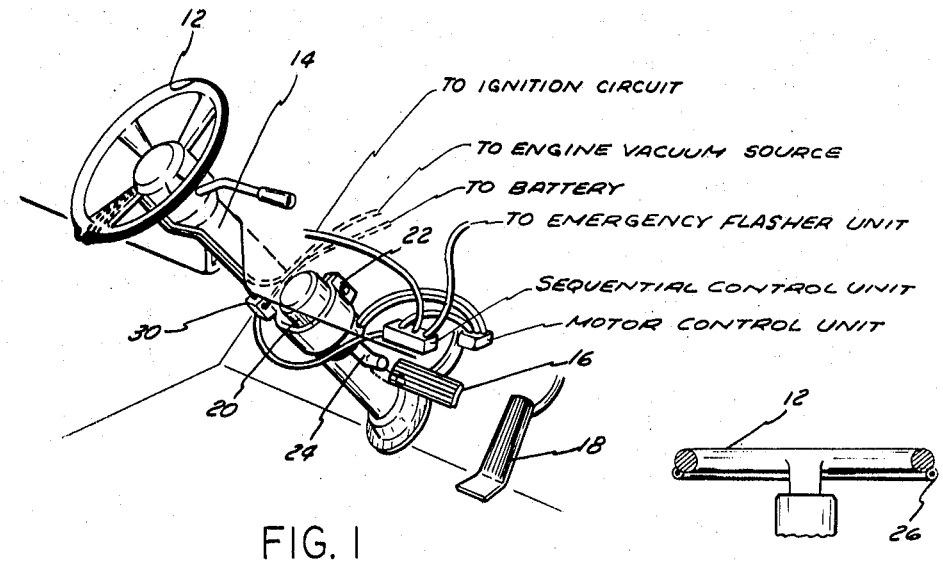
FIG. 1
FIG. 2
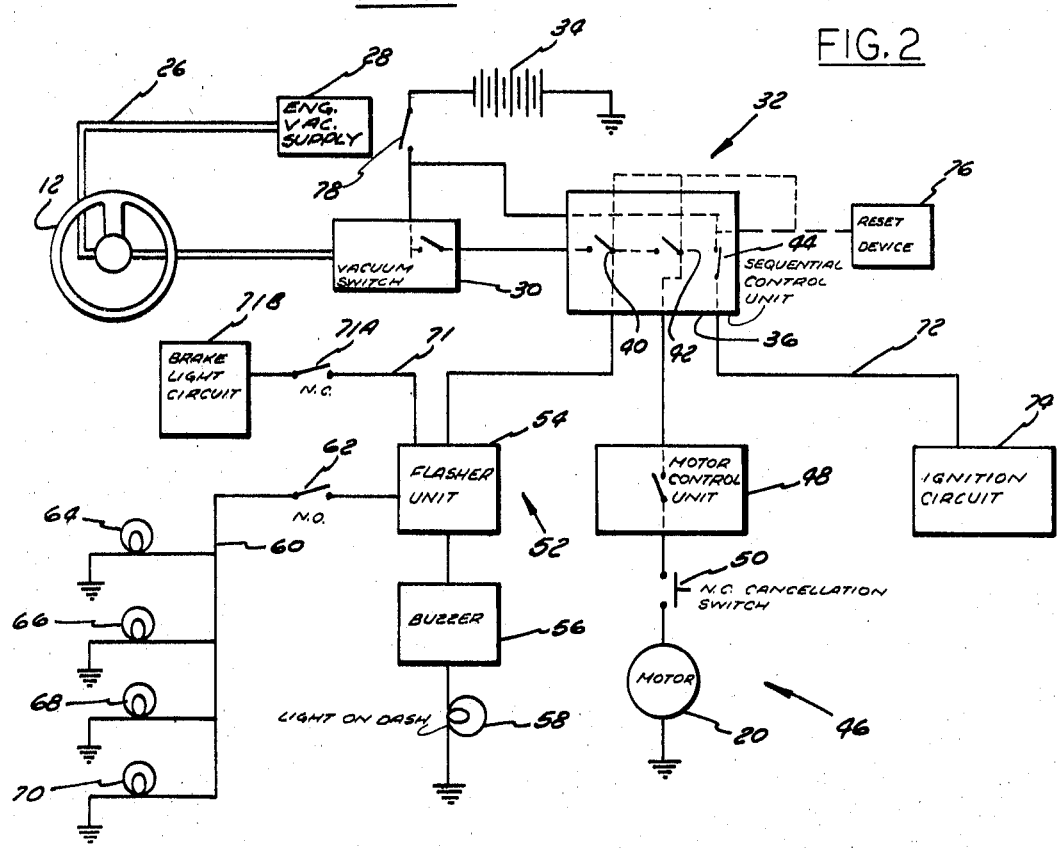
FIG. 3
INVENTOR
LEONARD A. BEECHAM
BY
ATTORNEYS United States Patent Office 3,559,206
Patented Jan. 26, 1971

3,559,206
VEHICLE SAFETY CONTROL SYSTEM
Leonard A. Beecham, 656 Ironwood,
Ann Arbor, Mich. 48103
Filed Mar. 29, 1968, Ser. No. 717,353
Int. Cl. B60t 7/00, 7/14; G08b 21/00
U.S. Cl. 340—279
10 Claims

ABSTRACT OF THE DISCLOSURE

A safety control system for controlling the motion of a motor vehicle when the operator of the vehicle unintentionally relaxes his grip on the steering wheel. A vacuum operated switch connected to the engine vacuum supply by a flexible tube wrapped around the steering wheel respons to the operator releasing his grip on the steering wheel and the tube to actuate an electrical circuit which initially energizes a flasher unit, a buzzer and the vehicle's emergency lights, then de-energizes the ignition circuit and finally energizes a motor actuated member that depresses the brake pedal to bring the vehicle to a stop.

BACKGROUND OF THE INVENTION

This invention relates to an automatic vehicle control system of the type which responds to a release of the steering mechanism by the operator to control the motion of the vehicle and more specifically to a system activated by engine vacuum through a connection formed of a flexible tube wrapped around the steering wheel which is released and gripper by the operator's fingers on the wheel.

Systems in the prior art which respond automatically to the operator of a vehicle releasing his grip on the steering wheel because of an abnormal condition, such as falling asleep, or having a heart attack, have usually employed some sort of electrical switch means on the steering wheel. The switch means are normally grasped by the operator, but when released actuates a circuit that energizes the braking mechanism of the vehicle. Examples of such systems are illustrated in Pats. No. 2,296,003; 2,304,546 and 2,128,916. In general, such devices of the prior art have been complicated, could not be readily adapted to standard vehicles and required a number of expensive components and installation costs.

The broad purpose of the present invention is to provide a control system of a relatively few, inexpensive components that can be readily installed on conventional vehicles.

SUMMARY

The preferred embodiment of the present invention, which will be described subsequently in greater detail, comprises an elongated, flexible rubber tube mounted around the underside of the steering wheel with one end connected to the vacuum supply of the vehicle's engine and the other end connected to a vacuum operated switch. The operator's fingers on the wheel and the tube cut off communication between the engine's vacuum and the vacuum switch. When the fingers are released from the tube, the switch is actuated. The vacuum operated switch forms part of an electrical circuit which includes a connection with the storage battery of the vehicle and a sequential control unit.

The sequential control unit upon activation of the vacuum operated switch initially energizes an emergency flasher system so as to warn other persons in the vehicle, if any, that an abnormal condition exists. A buzzer is also energized to alert the driver. After a timed interval, such as five seconds, the sequential control unit then de-energizes the ignition circuit. After another timed interval, such as five seconds, a motor operated brake actuator member commences to depress the brake pedal so as to bring the vehicle to a stop.

The motor control unit in the circuit is arranged to de-energize the motor of the brake actuator member when the brake pedal is fully depressed and acts as an overload device. A master switch in the electrical circuit functions to de-activate the control system when it is not required such as in-town driving.

The preferred system is composed of a relatively few components that can be assembled in the average vehicle in as little as 30 minutes. The flexible rubber tube replaces the electrical switches that are conventionally mounted on the steering wheel in prior art devices and provides an attractive appearance as well as a reliable element which immediately responds to the operator relaxing his finger muscles on the steering wheel.

Still other advantages of the present invention will become readily apparent to one skilled in the art to which the invention pertains upon reference to the following detailed description.

DESCRIPTION OF THE DRAWINGS

The description refers to the accompanying drawings in which like reference characters refer to like parts throughout the several views in which:

FIG. 1 is a perspective view showing the interior of the passenger compartment of the vehicle with the various components of the preferred control system mounted in position;

FIG. 2 is a sectional view through the steering wheel shown in FIG. 1, with the flexible rubber tube mounted in place; and FIG. 3 is a schematic view of the vacuum control system and the electrical control system in accordance with the present invention.

DESCRIPTION OF THE PREFERRED EMBODIMENT

Now referring to the drawings, FIG. 1 illustrates the interior of a vehicle passenger compartment and shows a conventional manually operated steering wheel 12 mounted on the upper end of a steering column jacket 14. Also illustrated is a conventional foot operated brake pedal 16 mounted adjacent a gas pedal 18 and adapted upon being depressed to energize the brake mechanism of the vehicle in the conventional manner.

A motor 20 is mounted by a bracket 22 to the steering column jacket 14 above the brake pedal and has a rod-like foot 24 which when the motor 20 is energized moves from a raised position to a lower position where it engages the brake pedal 16 and depresses it so as to bring the vehicle to a stop. The foot 24 is connected to the motor through a gear mechanism (not shown) which lowers the foot 24 at a controlled rate. The foot 24 is normally spaced above the brake pedal 16 a sufficient distance so as not to interfere with the normal motions of the operator's foot.

Now as can be seen in FIGS. 1 and 2, an elongated flexible, surgical rubber tube 26 is mounted around the lower periphery of the steering wheel by a suitable adhesive or the like, so that when the operator grasps the steering wheel, his fingers squeeze the flexible tube 26. The tube 26 extends from the steering wheel down the steering column jacket with one end being connected to the vacuum supply of the engine 28 of the vehicle. The opposite end of the tube 26 is connected to a vacuum operated switch 30 so that the switch 30 responds to the gripping and releasing of the steering wheel by the operator.

The vacuum switch 30 forms a part of an electrical circuit generally indicated at 32 which is connected to the battery 34 of the vehicle. Battery 34 is a source of electrical energy to the various components of the control system. The vacuum switch 30 is connected with a sequential control unit 36 adapted to actuate a series of relay type, time delay switches 40, 42 and 44 in a predetermined sequence. The sequential control unit is relatively conventional and for purposes of the description, includes normally open time delay switch 42 connected in a circuit 46 which includes the motor 20, a motor control unit 48 and a normally closed cancellation switch 50. When the switch 42 is closed, and with switch 40 closed, the motor 20 is energized so that the foot 24 depresses the brake pedal 16. The motor control unit 48 is a conventional overload device which de-energizes the motor when the brake pedal 16 has been effectively depressed so as to prevent further downward motion of the foot 24. The switch 50 provides means for the operator to de-energize the motor if he should regain control of the vehicle prior to the vehicle coming to a stop.

The time delay switch 40 is connected in a circuit 52 which includes a flasher unit 54 mounted on the vehicle so as to call attention to the condition of the driver to other parties, a buzzer 56 to wake the driver if he should fall asleep and a light 58 on the vehicle's dashboard which calls the attention of the passengers to the abnormal situation so that one of the passengers can attempt to gain control of the vehicle.

The circuit 52 also includes a circuit 60 with a normally open switch 62 which upon closing energizes emergency flashers 64, 66, 68 and 70 and which are exteriorly mounted on the vehicle and are required on newer model vehicles. Switch 62 is a relay type which closes when the flasher 54 is energized and arranged so as not to interfere with the remainder of the vehicle's electrical system.

A circuit 71 with a switch 71A is connected with the brake light circuit 71B so as to de-energize the vehicle's brake lights when the flasher unit 54 is energized.

The third time delay switch 44 is normally closed and forms a connection in a line 72 which connects the battery 34 with the ignition circuit 74 of the vehicle so that when switch 44 is open, the ignition circuit is de-energized.

A reset device 76 is connected to the time delay switches 40, 42 and 44 in such a manner as to restore them to their normal operating condition. A master switch 78 in the circuit is arranged to de-activate the control system during in-town driving or the like, and is preferably mounted on the dashboard of the vehicle.

In operation, assuming the master switch 78 is closed so that the control system is operative, the operator of the vehicle garsps the steering wheel 12 and the flexible tube 26 before turning on the ignition switch of the vehicle so that as the engine 28 begins to operate it develops a source of vacuum in the conventional manner with the flexible tube 26 acting as a valve between the engine and the vacuum switch 30. The ignition circuit 74 is then energized with the motor 20 and the flasher unit 54 being de-energized. When the operator relaxes his grip on the steering wheel so as to open communication between the engine 28 and the vacuum switch 30, the vacuum switch 30 responds by activating the sequential control unit 36. The time delay switches 40, 42 and 44 then begin to energize or de-energize their respective circuits in a predetermined sequence.

Initially the switch 40 is timed to close a predetermined period such as five seconds after the operator releases his grip which allows the operator to temporarily disengage the steering wheel 12 in a deliberate manner. At the end of five seconds the flasher unit 54 begins to flash, the buzzer 56 is energized, the brake light circuit 71B is de-energized and the emergency flashers 64, 66, 68 and 70 are energized. If the operator grasps the wheel and operates the reset device 76, the control circuit is returned to its normal condition.

A predetermined time after the circuit 52 is energized, the time delay switch 44 is activated so that it opens the circuit 72 between the ignition circuit 74 and the battery 34 so that the ignition system of the engine is de-energized terminating the power of the engine 28 to the wheels of the vehicle. A predetermined time after the ignition circuit is de-energized, the time delay switch 42 is activated so that it completes a circuit from the battery 34 through the circuit 46 so as to energize the motor 20 which commences to lower the foot 24. The foot 24 lowers and depresses the brake pedal 16 to bring the vehicle to a stop. At the end of the travel of the foot 24, the motor control unit 48 de-energizes the motor. At any time during the sequence the operator can regain control of the vehicle by grasping the steering wheel 12 and tube 26 and activating the reset device 76. The reset device can be adapted so that it automatically responds to the operator grasping the wheel to return the switches to their normal condition.

Thus it can be seen that I have described a relatively simple system that can be mounted on conventional vehicles to provide a means for protecting an operator of a vehicle who may fall asleep at the wheel, an intoxicated operator who becomes unable to control the vehicle, a sick operator who may collapse at the wheel and in addition the drivers of other vehicles who are often victims of such operators.

It is to be understood that although I have described but one embodiment of my invention, various changes and revisions can be made therein without departing from the spirit of the invention as expressed in the scope of the appended claims.

What is claimed is:

1. In a vehicle having a manually operated steering means, an actuated mechanism, a source of engine vacuum, a source of electrical energy, the improvement comprising an improved safety control system including: a vacuum responsive electrical switch; a flexible conduit mounted on said steering means and in communication with said source of engine vacuum and said electrical switch so that manual gripping and releasing of said steering means by the operator controls communication between said vacuum source and said vacuum responsive electrical switch; a source of electrical energy; actuator means operable upon being electrically energized to actuate said mechanism; and electrical circuit means interconnecting said source of electrical energy, said vacuum responsive electrical switch and said actuator means for energizing said actuator means from said source of electrical energy upon the closing of said electrical switch in response to a change in the vacuum applied thereto resulting from the release of said steering means and said flexible conduit by the operator.

2. In a vehicle as set forth in claim 1 including time delay means in said electrical circuit means for energizing said actuator means a timed interval after the closing of said vacuum responsive electrical switch.

3. In a vehicle as set forth in claim 1 wherein said vehicle includes a brake pedal and an adjacent steering column, said actuator means includes motor means mounted on said steering column and connected to said electrical circuit means to be energized by electrical energy therefrom and a brake control member movable by said motor means for engaging and depressing said brake pedal.

4. The invention as defined in claim 3, including motor control means for de-energizing said motor when the brake pedal has been operatively depressed.

5. The invention as defined in claim 1, wherein the vehicle has an electrical ignition circuit and including a sequential control means in said electrical circuit means connected with said ignition circuit to de-energize said ignition circuit and to energize the actuator means in a timed sequence.

6. The invention as defined in claim 1, wherein said vehicle has an electrical ignition circuit and including time delay means in said electrical circuit means connected with said ignition circuit to de-energize said ignition circuit, a predetermined timed interval after the vacuum responsive switch means is activated by the release of the steering wheel by the operator.

7. The invention as defined in claim 6, including second time delay means for energizing said actuator means a predetermined time interval after said ignition circuit is de-energized.

8. The invention as defined in claim 7, including flasher means connected with said electrical circuit means and third time delay means for actuating said flasher means a timed interval after the activation of the vacuum responsive switch means.

9. The invention as defined in claim 8, including sequential control means for controlling said timed delay means so that the flasher means is initially energized after the release of the steering wheel by the operator, the ignition circuit is de-energized a predetermined time interval after the energization of the flasher means, and the actuator means is energized a predetermined time interval after the ignition circuit is de-energized.

10. In a vehicle having a source of engine vacuum, a source of electrical energy, an electric ignition system, a passenger compartment and a manually-operated steering wheel and a foot-operated brake member in said passenger compartment, a control system for controlling the movement of the vehicle when the operator of the vehicle relaxes his grip on the steering wheel, comprising:
   (a) a brake control mechanism operable upon being electrically energized for engaging said foot operated brake member;
   (b) electrical indicating means;
   (c) electrical circuit means for connecting said source of electrical energy with said ignition circuit, said brake control mechanism and said indicating means;
   (d) sequential switch means in said electrical circuit means operable upon being activated for energizing said brake control mechanism and said indicating means and de-energizing said ignition circuit means in a predetermined sequence;
   (e) a source of engine vacuum;
   (f) a vacuum responsive switch means connected in said electrical circuit means to activate said sequential switch means;
   (g) an elongated flexible conduit having one end connected to said source of engine vacuum, its opposite end connected to said vacuum responsive switch means and an intermediate section mounted on the steering wheel so to be grasped by the operator when he grasps the steering wheel and that releasing of the steering wheel and the conduit by the operator causes said vacuum responsive switch means to be actuated by said source of engine vacuum and thereby actuate said sequential switch means.

References Cited

UNITED STATES PATENTS

| 2,287,199 | 6/1942 | Schick | 180—99X |
| 3,051,258 | 8/1962 | Byers | 340—279X |
| 3,186,508 | 6/1965 | Lamont | 180—99 |

THOMAS B. HABECKER, Primary Examiner

S. F. PARTRIDGE, Assistant Examiner

U.S. Cl. X.R.

180—82, 99; 200—61.57; 340—54